(12) United States Patent
Ravi et al.

(10) Patent No.: US 7,799,892 B2
(45) Date of Patent: Sep. 21, 2010

(54) METHOD OF MAKING POLYBUTYLENE TEREPHTHALATE AND COMPOSITIONS AND ARTICLES COMPRISING THE SAME

(75) Inventors: Gomatam Raghavan Ravi, Bangalore (IN); Deepak Ramaraju, Karnataka (IN); Srinivasan Krishnaswami, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 68 days.

(21) Appl. No.: 12/114,172

(22) Filed: May 2, 2008

(65) Prior Publication Data

US 2009/0275698 A1    Nov. 5, 2009

(51) Int. Cl.
*C08G 63/00* (2006.01)
(52) U.S. Cl. .............. 528/308.8; 528/308.3; 528/309.1; 528/495; 526/68
(58) Field of Classification Search ................. 525/437; 526/68; 528/495, 308.3, 308.8, 309.1
See application file for complete search history.

(56) References Cited

U.S. PATENT DOCUMENTS

| | | | |
|---|---|---|---|
| 2,465,319 A | 3/1949 | Whinfield et al. | |
| 2,720,502 A | 10/1955 | Caldwell | |
| 2,727,881 A | 12/1955 | Caldwell et al. | |
| 2,822,348 A | 2/1958 | Haslam | |
| 3,047,539 A | 7/1962 | Pengilly | |
| 3,766,146 A | 10/1973 | Witsiepe | |
| 3,907,868 A | 9/1975 | Currie et al. | |
| 3,953,394 A | 4/1976 | Fox et al. | |
| 3,953,404 A | 4/1976 | Borman | |
| 4,011,285 A | 3/1977 | Seymour et al. | |
| 4,096,156 A | 6/1978 | Freudenberger et al. | |
| 4,128,526 A | 12/1978 | Borman | |
| 4,355,155 A | 10/1982 | Nelsen | |
| 4,469,851 A | 9/1984 | Charles et al. | |
| 4,609,680 A * | 9/1986 | Fujita et al. | 521/48 |
| 5,266,601 A | 11/1993 | Kyber et al. | |
| 5,413,681 A | 5/1995 | Tustin et al. | |
| 5,451,611 A | 9/1995 | Chilukuri et al. | |
| 5,559,159 A | 9/1996 | Sublett et al. | |
| 6,162,837 A | 12/2000 | Gerking et al. | |
| 6,384,129 B1 | 5/2002 | Lowry | |
| 6,515,044 B1 | 2/2003 | Idel et al. | |
| 6,518,322 B1 | 2/2003 | West | |
| 6,887,909 B2 | 5/2005 | Kawamura et al. | |
| 6,927,275 B2 | 8/2005 | Hirokane et al. | |
| 7,179,869 B2 | 2/2007 | Hirokane et al. | |
| 7,183,362 B2 | 2/2007 | Hirokane et al. | |
| 7,388,067 B2 | 6/2008 | Leemans et al. | |
| 7,462,649 B2 | 12/2008 | Nakao et al. | |
| 2002/0012807 A1 | 1/2002 | Kurian et al. | |
| 2007/0275242 A1 * | 11/2007 | Gopal et al. | 428/401 |

FOREIGN PATENT DOCUMENTS

| | | |
|---|---|---|
| EP | 0683201 A1 | 11/1995 |
| GB | 1500577 | 2/1978 |
| JP | 2000-256472 A | 9/2000 |
| JP | 2005089572 | 4/2005 |
| KR | 20010083551 A | 9/2001 |
| WO | 03/066704 A1 | 8/2003 |

OTHER PUBLICATIONS

Machine Translation of JP 2005-089572, published Apr. 7, 2005; Shuji, I.; Kikutomo, S. [online], accessed via the Internet [retrieved on Oct. 16, 2009], URL: <http://www19.ipdl.inpit.go.jp/PA1/cgi-bin/PA1INIT?1241803069748>.*
Mansour, S.H.; Ikladious, N.E.; Journal of Elastomers and Plastics, 2003, vol. 35, p. 133-148.*
Article: "GE gives plastic bottle recycling a new spin", ChemicalProcessing.com, Aug. 25, 2006 [online], accessed via the Internet [retrieved on Oct. 16, 2009], URL: <http://www.chemicalprocessing.com/industrynews/2006/056.html>.*
Sivaram, S.; Upadhyay, V.K.; Bhardwa, I.S.; Polymer Bulletin, 1981, vol. 5, p. 159-166.*
Sheet 1, Highest, Lowest, and Mean Elevations in the US [online], accessed via the Internet [retrieved on Oct. 16, 2009], URL: <http://www.infoplease.com/ipa/A0001792.html>.*
Sheet 2, Elevation vs Atmospheric Pressure chart [online], accessed via the Internet [retrieved on Oct. 16, 2009], URL: <http://www.pdblowers.com/t8-elevation-versus-atmospheric-pressure.php>.*
Cooper, et al., "Life Cycle Engineering Guidelines," EPA/600/R-1/101 (2001).
International Search Report; International Application No. PCT/US2007/002197; International Filing Date: Jan. 26, 2007; Date of mailing: Jun. 19, 2007; 5 pages.

* cited by examiner

*Primary Examiner*—James Seidleck
*Assistant Examiner*—Robert Jones, Jr.
(74) *Attorney, Agent, or Firm*—Cantor Colburn LLP; Diderico van Eyl

(57) ABSTRACT

A process for making modified polybutylene terephthalate random copolymers from a polyethylene terephthalate component includes reacting an oligomeric diol component selected from the group consisting of bis(hydroxybutyl) terephthalate, bis(hydroxybutyl)isophthalate, hydroxybutyl-hydroxyethyl terephthalate, and combinations thereof to a reactor; (i) a polyethylene terephthalate component selected from the group consisting of polyethylene terephthalate and polyethylene terephthalate copolymers with (ii) a diol component selected from the group consisting of 1,4-butanediol, ethylene glycol, propylene glycol, and combinations thereof, in the reactor under conditions sufficient to depolymerize the polyethylene terephthalate component into a first molten mixture; combining the first molten mixture is combined with 1,4-butanediol under conditions to form a second molten mixture; and placing the second molten mixture under conditions sufficient to produce the modified polybutylene terephthalate random copolymers. Also described are compositions and articles made from the process.

34 Claims, No Drawings

US 7,799,892 B2

METHOD OF MAKING POLYBUTYLENE TEREPHTHALATE AND COMPOSITIONS AND ARTICLES COMPRISING THE SAME

BACKGROUND OF THE INVENTION

This disclosure relates to a method of making modified polyalkylene terephthalate polymers and compositions and articles comprising the same.

Polyethylene terephthalate (also referred to as "PET") is a polyester of terephthalic acid and ethylene glycol and can be obtained by the polycondensation of dimethyl terephthalate with ethylene glycol, or from terephthalic acid with ethylene glycol. PET can be amorphous and transparent or a semi-crystalline, opaque, and white thermoplastic material. PET can be chemically resistant to mineral oils, solvents, and acids, but can be susceptible to chemical attack by alkali. Semi-crystalline PET has good strength, ductility, stiffness, and hardness. Amorphous PET has better ductility than semi-crystalline PET, but less stiffness and hardness. PET is used to make bottles for soft drinks and other household, consumer, and industrial products.

Unfortunately, despite recycling efforts, billions of pounds of PET are dumped into landfills annually all over the world. Other PET that is not reused is incinerated. The substantial amount of PET that is disposed into landfills creates significant waste. The incineration of PET wastes significant resources that could be used more effectively.

Thermoplastic molding compositions based on polybutylene terephthalate (also referred to as "PBT") and a filler are used in various applications. Although conventional PBT-filler molding compositions are useful in many applications, conventional PBT-filler molding compositions generally cannot be made from recycle sources of PBT due to the lack of availability of PBT recycle streams. PET, unlike PBT, is made in much larger quantities and is partially recovered from consumer wastes. If PET, especially scrap PET, could be converted to PBT suitable for use in molding compositions, this would be valuable in meeting the current need to effectively use underutilized scrap PET in PBT thermoplastic molding compositions.

U.S. Pat. No. 5,451,611 teaches a process for converting waste poly(ethylene terephthalate) to either poly(ethylene-co-butylene terephthalate) or poly(butylene terephthalate) (PBT) by reaction with 1,4-butanediol. In discussing the prior art, U.S. Pat. No. 5,451,611 indicates that in most of the processes it cites, the undesirable byproduct diethylene glycol is formed, which contaminates the final product and has to be removed by purification before the recovered products can be reused again. A principal object of U.S. Pat. No. 5,451,611 was to provide a process for converting poly(ethylene terephthalate) waste directly into another high value polymer without breaking down the poly(ethylene terephthalate) to its constituent monomers or oligomers. The patent discloses numerous examples in which a variety of polymers have a diol incorporated at various amounts. Example 11 shows a PBT polymer being formed with a complete replacement of ethylene glycol with 1,4-butanediol.

U.S. Pat. No. 5,266,601 teaches a process for making PBT from PET by reacting PET with 1,4-butanediol. A principal object of U.S. Pat. No. 5,266,601 was to produce PBT containing less than 1.0 wt. % units of ethylene glycol from PET scrap. Another principal objective of U.S. Pat. No. 5,266,601 was to develop a process that facilitates the reduction of THF generated in the process. U.S. Pat. No. 5,266,601 discloses the production of PBT having ethylene glycol groups in an amount that is less than 1 wt. %. U.S. Pat. No. 5,266,601 discloses that "[a]ny diethylene glycol units in the starting PET are also eliminated as completely as possible" (Col. 3, 11 37-38). The patent discloses "adding only enough 1,4BD [1,4-butanediol] to the PET as is necessary to yield a mixture that can be processed well at the reaction temperature." The patent discloses that, depending on the PET used "up to 1.0 mol 1,4-BD per mol PET" can be used. In the instances where compositions contain more than 1 wt. % ethylene glycol, U.S. Pat. No. 5,266,601 presents these compositions in comparative examples. Such compositions are described as having "yellowish" and "slightly yellowish" color, respectively. It is not clear what standard is used in U.S. Pat. No. 5,266,601 to determine the weight percent reported, as the weight percent can reasonably be defined based on either (i) a divalent ethylene radical remaining after removal of hydroxyl groups from ethylene glycol, or (ii) a divalent radical remaining after removal of terminal hydrogen atoms from ethylene glycol. Each moiety has a different molecular weight and, as such, each moiety can produce a different value.

Japanese laid-open application 2005-89572 teaches a method for producing polybutylene terephthalate by transesterifying bis(2-hydroxyethyl) terephthalate with 1,4-butanediol in the presence of a transesterification reaction catalyst under a pressure of 1-54 kPa at a final temperature from 200 to 230° C. and then subjecting the reaction product to polycondensation. In one embodiment, the bis(2-hydroxyethyl) terephthalate is obtained by depolymerizing polyethylene terephthalate with excessive ethylene glycol, and purifying the depolymerized product. The patent teaches that transesterifying bis(2-hydroxyethyl) terephthalate with 1,4-butanediol under reduced pressure imparts favorable results.

Despite extensive efforts, there remains a long felt need to improve the use of PET scrap that is ordinarily incinerated or buried in landfills. U.S. Pat. No. 5,451,611, for instance, does not teach effective processes to break down PET into its constituent monomers or oligomers—a feature that can be commercially desirable. U.S. Pat. No. 5,451,611 does not provide meaningful guidelines for making compositions functionally similar to a PBT containing ethylene glycol in amounts other than trace amounts and in which exhibit melting temperatures are higher than those shown in its examples. Similarly, U.S. Pat. No. 5,266,601 does not provide meaningful details about how to make effective PBT materials with ethylene glycol in amounts more than 1.0 wt. % or with other residues that can be found in some PET scrap. Also, U.S. Pat. No. 5,266,601 does not disclose processes that can use excess 1,4-butanediol, relative to the PET scrap used, or processes that do not require that the diethylene glycol be "eliminated as completely as possible."

For at least the foregoing reasons, there remains a need to develop a process for making PBT random copolymers from PET that have useful performance properties. In addition, there remains a need to develop articles from molding compositions that utilize PBT derived from PET and that have useful performance properties.

BRIEF DESCRIPTION OF THE INVENTION

The above described and other drawbacks are alleviated by a process for the manufacture of a modified polybutylene terephthalate copolymer, the process comprising: reacting (i) an oligomeric diol component selected from the group consisting of bis(hydroxybutyl) terephthalate, bis(hydroxybutyl) isophthalate, hydroxybutyl-hydroxyethyl terephthalate, hydroxybutyl-hydroxyethyl isophthalate, bis(hydroxypropyl) terephthalate, bis(hydroxypropyl)isophthalate, hydroxybutyl-hydroxypropyl terephthalate, hydroxybutyl-hydroxypropyl isophthalate, hydroxyethyl-hydroxypropyl terephthalate, hydroxyethyl-hydroxypropyl isophthalate, and combinations thereof in a reactor, with (ii) a polyethylene terephthalate component selected from the group consisting of polyethylene terephthalates, polyethylene terephthalate copolymers, and combinations thereof, and (iii) a monomer diol component selected from the group consisting of 1,4-butanediol, ethylene glycol, propylene glycol, and combinations thereof in a reactor under conditions effective to depolymerize the polyethylene terephthalate component to form a first molten mixture, the first molten mixture comprising a component selected from the group consisting of oligomers comprising ethylene terephthalate moieties, oligomers comprising ethylene isophthalate moieties, oligomers comprising diethylene glycol terephthalate moieties, oligomers comprising diethylene glycol isophthalate moieties, oligomers comprising trimethylene terephthalate moieties, oligomers comprising trimethylene isophthalate moieties, oligomers comprising butylene terephthalate moieties, oligomers comprising butylene isophthalate moieties, oligomers comprising dibutylene terephthalate moieties, oligomers comprising dibutylene isophthalate moieties, covalently bonded oligomeric moieties comprising at least two of the foregoing moieties, ethylene glycol, propylene glycol, 1,4-butanediol, and combinations thereof; adding 1,4-butanediol to the first molten mixture under conditions effective to form a second molten mixture comprising a component selected from the group consisting of oligomers comprising ethylene terephthalate moieties, oligomers comprising ethylene isophthalate moieties, oligomers comprising diethylene glycol terephthalate moieties, oligomers comprising diethylene glycol isophthalate moieties, oligomers comprising trimethylene terephthalate moieties, oligomers comprising trimethylene isophthalate moieties, oligomers comprising butylene terephthalate moieties, oligomers containing butylene isophthalate moieties, covalently bonded oligomeric moieties comprising at least two of the foregoing moieties, 1,4-butanediol, propylene glycol, ethylene glycol, and combinations thereof; and increasing the temperature of the second molten mixture to form the modified polybutylene terephthalate copolymer.

According to another embodiment, a process for the manufacture of a modified polybutylene terephthalate copolymer comprises: reacting (i) an oligomeric diol component selected from the group consisting of bis(hydroxybutyl) terephthalate, bis(hydroxybutyl)isophthalate, hydroxybutyl-hydroxyethyl terephthalate, hydroxybutyl-hydroxyethyl isophthalate, bis(hydroxypropyl) terephthalate, bis(hydroxypropyl)isophthalate, hydroxybutyl-hydroxypropyl terephthalate, hydroxybutyl-hydroxypropyl isophthalate, hydroxyethyl-hydroxypropyl terephthalate, hydroxyethyl-hydroxypropyl isophthalate, and combinations thereof to a reactor, with (i) a polyethylene terephthalate component selected from the group consisting of polyethylene terephthalate and polyethylene terephthalate copolymers and (ii) a monomer diol component selected from the group consisting of 1,4-butanediol, ethylene glycol, propylene glycol, and combinations thereof in a reactor under conditions effective to depolymerize the polyethylene terephthalate component to form a first molten mixture, the first molten mixture comprising a component selected from the group consisting of oligomers comprising ethylene terephthalate moieties, oligomers comprising ethylene isophthalate moieties, oligomers comprising diethylene glycol terephthalate moieties, oligomers comprising diethylene glycol isophthalate moieties, oligomers comprising trimethylene terephthalate moieties, oligomers comprising trimethylene isophthalate moieties, oligomers comprising butylene terephthalate moieties, oligomers comprising butylene isophthalate moieties, oligomers comprising dibutylene terephthalate moieties, oligomers comprising dibutylene isophthalate moieties, covalently bonded oligomeric moieties comprising at least two of the foregoing moieties, ethylene glycol, propylene glycol, 1,4-butanediol, and combinations thereof; adding 1,4-butanediol to the first molten mixture under conditions effective to form a second molten mixture, the second molten mixture comprising a component selected from the group consisting of oligomers comprising ethylene terephthalate moieties, oligomers comprising ethylene isophthalate moieties, oligomers comprising diethylene glycol terephthalate moieties, oligomers comprising diethylene glycol isophthalate moieties, oligomers comprising trimethylene terephthalate moieties, oligomers comprising trimethylene isophthalate moieties, oligomers comprising butylene terephthalate moieties, oligomers containing butylene isophthalate moieties, covalently bonded oligomeric moieties comprising at least two of the foregoing moieties, 1,4-butanediol, propylene glycol, ethylene glycol, and combinations thereof; and increasing the temperature of the second molten mixture to form the modified polybutylene terephthalate copolymer; and further comprising collecting excess oligomeric diol component during the adding of the 1,4-butanediol under conditions effective to form a second molten mixture; and returning the collected oligomeric diol component to the reactor during the reacting of the oligomeric diol component, the monomeric diol component, and the polyethylene terephthalate component.

Compositions comprising the above described modified polybutylene terephthalate copolymers are also described, as well as articles comprising the compositions.

Various other features, aspects, and advantages of the present invention will become more apparent with reference to the following description, examples, and appended claims.

DETAILED DESCRIPTION OF THE INVENTION

The invention is based on the discovery that it is now possible to make a modified PBT copolymer that is derived from polyethylene terephthalate in a novel and effective process using an oligomeric diol during depolymerization of the PET. Unlike PBT manufactured from monomers using conventional methods, the modified PBT comprises, in addition to other materials, residues derived from ethylene glycol and isophthalic acid (residues that are not present in PBT made by conventional methods).

As used herein, the singular forms "a", "an" and "the" include plural referents unless the context clearly dictates otherwise. It is to be understood that the terms "step (a)", "step (b)", and the like are used herein for convenient reference in the discussion, and other steps can be performed at any point in the process, e.g., between "step (a)" and "step (b)".

"Optional" or "optionally" means that the subsequently described event or circumstance can or cannot occur, and that the description includes instances where the event occurs and instances where it does not.

"Combination" as used herein includes mixtures, copolymers, reaction products, blends, composites, and the like.

Other than the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The phrase "from more than 0 to" an amount means that the named component is present in some amount more than 0, and up to and including the higher named amount.

All molecular weights in this application refer to number average molecular weight obtained with a polystyrene standard. Details of the technique include the following: (i) Instrument: Waters 2695 separation module; (ii) Detector: Waters 2487 Dual Absorbance Ultraviolet Detector at 273 and 295 nanometers and Water 410 refractomer; (iii) Mobile phase: 5% HFIP, 95% chloroform; (iv) GPC columns: Polymer Labs PL HFIP gel, 250×4.6 mm, (v) Flow rate: 0.3 ml/min; (vi) Injection volume 10 μl; (vii) Polystyrene standards: Polymer Lab's Easical PS-1, 580-7,500,000 Da.

For the sake of clarity, terms such as "isophthalic acid group," "ethylene glycol group," and "diethylene glycol group" being used, e.g., to indicate the weight % of the group in a composition, means the residue of the named group in the polyester. Thus, the term "isophthalic acid group" means the group having the formula (—O(CO)$C_6H_4$(CO)—), the term "terephthalic acid group" means the group having the formula (—O(CO)$C_6H_4$(CO)—), the term diethylene glycol group means the group having the formula (—O($C_2H_4$)O($C_2H_4$)—), the term "butanediol group" means the group having the formula (—O($C_4H_8$)—), and the term "ethylene glycol groups" means the group having the formula (—O($C_2H_4$)—).

According to one embodiment, polybutylene terephthalate can be prepared from scrap polyethylene terephthalate. The modified PBT copolymer made by the process comprises ethylene glycol and isophthalic acid groups, which are not present in virgin PBT. However, the polybutylene terephthalate made using the disclosed method, although structurally different from the PBT of known compositions, exhibits similar performance properties as that of "virgin PBT" (PBT that is derived from monomers). In another embodiment, the process can lead to less generation of tetrahydrofuran. It can also result in effective utilization of the raw materials (such as butanediol), leading to a more cost effective method of making polybutylene terephthalate.

In one embodiment, the modified polybutylene terephthalate copolymer derived from polyethylene terephthalate (also referred to herein as "PET-derived modified PBT copolymer") is (1) derived from a polyethylene terephthalate component selected from the group consisting of polyethylene terephthalate, polyethylene terephthalate copolymer, and mixtures thereof, and (2) has at least one residue derived from the polyethylene terephthalate component. In another embodiment, the modified polybutylene terephthalate copolymer can further be derived from a biomass-derived 1,4-butanediol, e.g. corn derived 1,4-butanediol, or a 1,4-butanediol derived from a cellulosic material.

The term "biomass" means living or dead biological matter that can can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass materials. Exemplary chemical substances derived from biomass include diols, diacids, monomers used to make diols or acids, e.g., succinic acid, monomers used to make polymers, or the like, or a combination comprising at least one of the foregoing chemical substances. Biomass based butanediol can be obtained from several sources. For example, the following process can be used to obtain biomass-based 1,4-butanediol. Agriculture based biomass, such as corn, can be converted into succinic acid by a fermentation process that also consumes carbon dioxide. Such succinic acid can be commercially available from several sources such as from Diversified Natural Products Inc. under the trade name "BioAmber™". This succinic acid can be converted into 1,4-butanediol by processes described in several published documents such as in U.S. Pat. No. 4,096,156, which is incorporated by reference herein in its entirety. Biomass-derived 1,4-butanediol can also be converted to tetrahydrofuran, and further converted to polytetrahydrofuran, also known as polybutylene oxide glycol. Another process that describes converting succinic acid into 1,4-butanediol is described in Life Cycles Engineering Guidelines, by Smith et al., as described in EPA publication EPA/600/R-1/101 (2001).

In one embodiment, the residue derived from the polyethylene terephthalate component present in the modified polybutylene terephthalate copolymer can be selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, cis-1,3-cyclohexane dimethanol, cis-1,4-cyclohexane dimethanol, trans-1,3-cyclohexane dimethanol, trans-1,4-cyclohexane dimethanol, alkali salts, alkaline earth metal salts, including calcium, magnesium, sodium and potassium salts, phosphorous-containing compounds and anions, sulfur-containing compounds and anions, napthalene dicarboxylic acids, 1,3-propanediol groups, and combinations thereof.

Depending on factors such as whether polyethylene terephthalate or polyethylene terephthalate copolymers are used, the residue can include various combinations. In one embodiment, for instance, the residue can include mixtures of ethylene glycol groups and diethylene glycol groups. In another embodiment, the residue can comprise mixtures of ethylene glycol groups, diethylene glycol groups, and isophthalic acid groups, or a combination comprising at least one of the foregoing groups. In another embodiment, the residue derived from polyethylene terephthalate can further include cis-1,3-cyclohexane dimethanol groups, 1,4-cyclohexane dimethanol groups, trans-1,3-cyclohexane dimethanol groups, trans-1,4-cyclohexane dimethanol groups, or combinations thereof. In another embodiment, the residue can comprise cis-1,3-cyclohexane dimethanol groups, cis-1,4-cyclohexane dimethanol groups, trans-1,3-cyclohexane dimethanol groups, trans-1,4 cyclohexane dimethanol groups, or combinations thereof. In another embodiment, the residue can be a mixture of ethylene glycol groups, diethylene glycol groups, isophthalic acid groups, cis-cyclohexane dimethanol groups, trans cyclohexane dimethanol groups, or the like, or combinations thereof. In one embodiment, the residue derived from polyethylene terephthalate can include mixtures of ethylene glycol groups, diethylene glycol groups, a cobalt-containing compound, or a combination comprising at least one of the foregoing groups and compounds. Such cobalt-containing compound residues can also contain isophthalic acid groups.

In a specific embodiment, the modified polybutylene terephthalate copolymer derived from polyethylene terephthalate (i.e., the modified polybutylene terephthalate copolymers containing residues derived from polyethylene terephthalate) can be a random copolymer comprising polyester units selected from the following formulas (1), (2), (3), and (4):

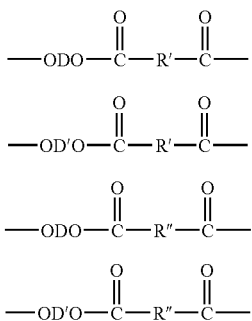

wherein D is a 1,4-butylene(-(C₄H₈)—); D' is ethylene (-(C₂H₄)—); R' is terephthalylene(-1,4-(C₆H₄)—); and R" is an isophthalylene(-1,3-(C₆H₄)—).

In another embodiment, the modified polybutylene terephthalate copolymer can contain residues derived from polyethylene terephthalate and can also contain diethylene glycol groups. In still another embodiment, the modified polybutylene terephthalate random copolymer can contain residues selected from the group of formulas (1), (2), (3), (4), (5), or (6):

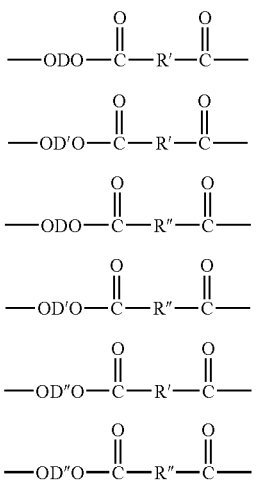

wherein D is 1,4-butylene(-(C₄H₈)—); D' is ethylene(-(C₂H₄)—); R' is terephthalylene(-1,4-(C₆H₁)—); R" is an isophthalylene(-1,3-(C₆H₄)—); and D" is propylene (-(C₃H₆)—). In yet another embodiment, the modified polybutylene terephthalate polymer can further include at least one residue derived from the polyethylene terephthalate component and selected from the group consisting of ethylene glycol groups, diethylene glycol groups, isophthalic acid groups, and combinations thereof.

In one embodiment, the amount of the ethylene glycol groups, diethylene glycol groups, propylene glycol groups, and the isophthalic groups in the polymeric backbone of the modified PBT copolymer can vary. The PET-derived modified PBT copolymer can contain isophthalic acid groups in an amount that is at least 0.1 mole %, specifically from 0 or 0.1 to 10 mole % (0 or 0.07 to 7 wt. %). The PET-derived modified PBT copolymer can contain ethylene glycol groups in an amount that is at least 0.1 mole %, specifically from 0.1 to 10 mole %. (0.02 to 2 wt. %). In one embodiment, the PET-derived modified PBT copolymer can have an ethylene glycol group content that can be more than 0.85 wt. %. In another embodiment, the modified PBT copolymer can also contain diethylene glycol groups in an amount from 0.1 to 10 mole % (0.04 to 4 wt. %). In another embodiment, the modified PBT copolymer can also contain propylene glycol groups in an amount from 0.1 to 10 mole %. The amount of the butanediol groups can be about 98 mole %, specifically from 95 to 99.8 mole % in some embodiments. In an embodiment, the amount of the terephthalic acid groups can be about 98 mole %, specifically from 90 to 99.9 mole %.

Unless otherwise specified, all molar amounts of the isophthalic acid groups and or terephthalic acid groups are based on the total moles of diacids/diesters in the composition. Unless otherwise specified, all molar amounts of the butanediol, ethylene glycol, and diethylene glycol groups are based on the total moles of diol in the composition. The weight percent measurements stated above are based on the above definitions of the terephthalic acid groups, isophthalic acid groups, ethylene glycol groups, and diethylene glycol groups.

The total amount of polyethylene terephthalate component residue in the modified polybutylene random copolymer can vary. For instance, the residues can be present in an amount from 1.8 to 2.5 wt. %, specifically from 0.5 to 2 wt. %, more specifically from 1 to 4 wt. %. The ethylene glycol, diethylene glycol, and cyclohexane dimethanol groups can be individually or in combination be present in an amount from 0.1 to 10 mole %, specifically 2 to 8 mole % based on 100 mole % of glycol in the modified PBT copolymer. The isophthalic acid groups can be present in an amount from 0.1 to 10 mole %, specifically 2 to 8 mole % based on 100 mole % of diacid/diester in the modified PBT copolymer.

It has been found that to make a polybutylene terephthalate copolymer having a melting temperature (Tm) that is at least 200° C., the total amount of diethylene glycol, ethylene glycol, and isophthalic acid groups should be within a selected range. In one embodiment, the total amount of the diethylene glycol, ethylene glycol, and isophthalic acid groups in the modified polybutylene terephthalate copolymer can be more than 0 to 23 equivalents, relative to a total of 100 equivalents of diol and 100 equivalents of diacid groups in the modified polybutylene terephthalate random copolymer. In another embodiment, the total amount of the isophthalic acid groups, ethylene glycol groups, and diethylene glycol groups can range from 3 to 23 equivalents, relative to a total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups can range from 3 to 10 equivalents, relative to a total of 100 equivalents of diol and 100 equivalents of diacid groups in the modified polybutylene terephthalate random copolymer. In yet another embodiment, the total amount of the isophthalic acid groups, ethylene glycol groups, and diethylene glycol groups can range from 10 to 23 equivalents, relative to a total of 100 equivalents of diol and 100 equivalents of diacid groups in the modified polybutylene terephthalate random copolymer. In one embodiment, diethylene glycol, ethylene glycol, and/or isophthalic acid can be added as monomers during the process.

In one embodiment, the total amount of inorganic residues in the polybutylene terephthalate derived from the polyethylene terephthalate can be from more than 0 ppm to 1000 ppm, based on the parts by weight of the modified PBT copolymer. Non-limiting examples of such inorganic residues include of antimony-containing compounds, germanium-containing compounds, titanium-containing compounds, cobalt-containing compounds, tin-containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. In another embodiment, the amounts of inorganic residues can range from 250 to 1000 ppm, based on the parts by weight of the modified PBT copolymer. In yet another embodiment, the amounts of inorganic residues can range from 500 to 1000 ppm, based on the parts by weight of the modified PBT copolymer.

The process for producing a modified PBT copolymer comprises:

(a) adding an oligomeric diol component selected from the group consisting of bis(hydroxybutyl) terephthalate, bis(hydroxybutyl)isophthalate, hydroxybutyl-hydroxyethyl terephthalate, hydroxybutyl-hydroxyethyl isophthalate, bis(hydroxypropyl) terephthalate, bis(hydroxypropyl)isophthalate, hydroxybutyl-hydroxypropyl terephthalate, hydroxybutyl-hydroxypropyl isophthalate, hydroxyethyl-hydroxypropyl terephthalate, hydroxyethyl-hydroxypropyl isophthalate, and combinations thereof to a reactor;

(b) reacting the oligomeric diol component with (i) a polyethylene terephthalate component selected from the group consisting of polyethylene terephthalate and polyethylene terephthalate copolymers and (ii) a diol component selected from the group consisting of 1,4-butanediol, ethylene glycol, propylene glycol, and combinations thereof; in the reactor under conditions sufficient to depolymerize the polyethylene terephthalate component into a first molten mixture containing a component selected from the group consisting of oligomers containing ethylene terephthalate moieties, oligomers containing ethylene isophthalate moieties, oligomers containing diethylene glycol terephthalate moieties, oligomers containing diethylene glycol isophthalate moieties, oligomers containing trimethylene terephthalate moieties, oligomers containing trimethylene isophthalate moieties, oligomers containing butylene terephthalate moieties, oligomers containing butylene isophthalate moieties, oligomers containing dibutylene terephthalate moieties, oligomers containing dibutylene isophthalate moieties, covalently bonded oligomeric moieties containing at least two of the foregoing moieties, ethylene glycol, propylene glycol, 1,4-butanediol and combinations thereof;

(c) adding 1,4-butanediol to the first molten mixture under conditions that are sufficient to form a second molten mixture containing a component selected from the group consisting of oligomers containing ethylene terephthalate moieties, oligomers containing ethylene isophthalate moieties, oligomers containing diethylene glycol terephthalate moieties, oligomers containing diethylene glycol isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (d) increasing the temperature of the second molten mixture to form a modified polybutylene terephthalate polymer.

Step (a), adding the oligomeric component, can be carried out prior to the reacting or at the same time as the reacting. In one embodiment, the oligomeric diol component is a bis (hydroxybutyl) terephthalate, a bis(hydroxybutyl)isophthalate, a hydroxybutyl-hydroxyethyl terephthalate, or combinations thereof. In another embodiment, the oligomeric diol component is derived from structure (I)

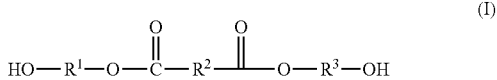

wherein $R^2$ is selected from the group consisting of structure (II) and structure (III)

wherein $R^1$ and $R^3$ are independently at each occurrence selected from the group consisting of $-(CH_2)_4-$, $-(CH_2)_2-$, $-(CH_2)_2-O-(CH_2)_2-$, and $-(CH_2)_3-$. Specifically, $R^1$ and $R^3$ are independently at each occurrence selected from the group consisting of $-(CH_2)_4-$, $-(CH_2)_2-$, and $-(CH_2)_3-$. Alternatively, $R^1$ and $R^3$ can be the same, and are selected from the group consisting of $-(CH_2)_4-$ and $-(CH_2)_2-$. In yet another embodiment, the oligomeric diol component can contain at least 50 percent of bis(hydroxybutyl) terephthalate. In one embodiment, the weight ratio of oligomeric diol component to PET component can range from about 0.5 to about 5.0, specifically from 1.0 to 4.0, more specifically from 1.0 to 2.0. The oligomeric diol component and the monomeric diol component can be present in a mole ratio from 0.25 to 4.0 in step (b).

The monomeric diol component used in the step (b) of the process can be selected from ethylene glycol, 1,4-butanediol, propylene glycol, and combinations thereof. It will be appreciated that the molten mixture that forms from the polyethylene terephthalate can vary, depending on how it is depolymerized. In one embodiment, when the polyethylene terephthalate component is depolymerized with an oligomeric diol component and an ethylene glycol, a first molten mixture can comprise oligomers containing ethylene terephthalate groups, oligomers comprising ethylene isophthalate groups, oligomers comprising diethylene terephthalate groups, oligomers comprising diethylene isophthalate groups, covalently bonded oligomeric groups comprising at least two of the foregoing moieties, ethylene glycol glycol, or combinations thereof. In another embodiment, when the polyethylene terephthalate component is depolymerized with an oligomeric diol component and propylene glycol, the first molten mixture can comprise oligomers comprising ethylene terephthalate groups, oligomers comprising ethylene isophthalate groups, oligomers comprising diethylene terephthalate groups, oligomers comprising diethylene isophthalate groups, oligomers comprising trimethylene terephthalate groups, oligomers comprising trimethylene isophthalate moieties, covalently bonded oligomeric groups comprising at least two of the foregoing groups, ethylene glycol, propylene glycol, or combinations thereof. In another embodiment, when the polyethylene terephthalate component is depolymerized with oligomeric diol component and butanediol, the first molten mixture can contain oligomers comprising butylene terephthalate moieties, oligomers comprising ethylene isophthalate moieties, oligomers comprising butylene terephthalate moieties, oligomers comprising butylene isophthalate moieties, covalently bonded oligomeric moieties comprising at least two of the foregoing moieties, 1,4-butandiol, ethylene glycol, or combinations thereof. In another embodiment, the polyethylene terephthalate can be depolymerized with mixtures of an oligomeric diol component, ethylene glycol, and 1,4-butanediol. When "propylene glycol" is used in the depolymerization of the PET component, it is understood that either 1,3 propylene glycol, or 1,2 propylene glycol can be used.

The process includes a depolymerization wherein a polyethylene terephthalate component selected from the group consisting of polyethylene terephthalate, polyethylene terephthalate copolymer, and a combination comprising at least one of the foregoing, reacts with a combination of the oligomeric diol component and the monomeric diol component selected from the group consisting of 1,4-butanediol, ethylene glycol, propylene glycol, and combinations thereof, in a reactor which contains the oligomeric diol component under conditions sufficient to depolymerize the polyethylene terephthalate component into a first molten mixture containing a component selected from the group consisting of oligomers containing ethylene terephthalate moieties, oligomers containing ethylene isophthalate moieties, oligomers containing diethylene glycol terephthalate moieties, oligomers containing diethylene glycol isophthalate moieties, oligomers containing trimethylene terephthalate moieties, oligomers containing trimethylene isophthalate moieties, butylene terephthalate moieties, oligomers containing butylene terephthalate moieties, oligomers containing butylene isophthalate moieties, oligomers containing dibutylene terephthalate moieties, oligomers containing dibutylene isophthalate moieties, covalently bonded oligomeric moieties containing at least two of the foregoing moieties, ethylene glycol, propylene glycol, 1,4-butanediol, and combinations thereof. In one embodiment, the reaction of the oligomeric diol component with the polyethylene terephthalate component and the monomeric diol can be carried out under agitation.

The PET component from which the ionomeric, modified PBT random copolymer is made can be in a variety of forms. The PET component can include recycle (scrap) PET in flake, powder/chip, film, or pellet form. Before use, the PET can be processed to remove impurities such as paper, adhesives, polyolefin, e.g., polypropylene, polyvinyl chloride (PVC), nylon, polylactic acid, and other contaminants. Also, the PET component can include PET that is not scrap or waste in flake, chip, or pellet form. As such, PET that would ordinarily be deposited in landfills can now be used productively and effectively. In one embodiment, the PET component can also include other polyesters. The PET component can also include polyester copolymers. Exemplary materials include polyalkylene terephthalates selected from the group consisting of polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polybutylene terephthalate, poly-xylylene terephthalate, polydianol terephthalates, polybutylene terephthalate, polytrimethylene terephthalate, polyalkylene naphthalates, and combinations thereof.

In one embodiment, the monomeric diol component and the oligomeric diol component can be present in step (b) in a molar amount that is at least half the amount of ethylene glycol moieties present in the polyethylene terephthalate component. In one embodiment, the diol component selected from the group consisting of ethylene glycol, 1,4-butanediol, propylene glycol, and combinations thereof is present in step (a) at a molar amount that is at least 25% of the amount of ethylene glycol moieties present in the polyethylene terephthalate component. In another embodiment, the monomeric diol component and the oligomeric diol component can be present in step (a) at a molar amount from 50 to 250 mole percent of the amount of ethylene glycol moieties present in the polyethylene terephthalate component. In another embodiment, the oligomeric diol component and the monomeric diol component can be present in a mole ratio from 0.25 to 4.0.

In one embodiment, the step (b) can be carried out for a period of at least 25 minutes at a temperature from 180° C. to 250° C. In another embodiment, the step (b) can be carried out at a pressure from 100 kPa to 500 kPa absolute. In one embodiment, an excess of the monomeric diol component selected from butanediol, ethylene glycol, propylene glycol, tetrahydrofuran, or combinations thereof can be removed.

In one embodiment, the process includes a step (c) where 1,4-butanediol can be added to the first molten mixture in a reactor under conditions that are sufficient to form a second molten mixture containing a component selected from the group consisting of oligomers containing ethylene terephthalate moieties, oligomers containing ethylene isophthalate moieties, oligomers containing diethylene glycol terephthalate moieties, oligomers containing diethylene glycol isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof. In one embodiment, a catalyst can be added during step (c). In another embodiment, the process can include the step of adding a catalyst during any step (a), step (b), step (c), step (d), and combinations thereof.

In one embodiment, the step (c) can be carried out at a pressure from 40 kPa to 100 kPa absolute, specifically 60 to 80 kPa absolute, at a temperature from 180° C. to 230° C., specifically 200° C. to 220° C. In another embodiment, the step (c) can be practiced for a sufficient period of time to reduce at least 65% of ethylene glycol from the second molten mixture. In yet another embodiment, the step (c) can be carried out for at least 30 minutes. In one embodiment, the step (c) can be practiced for a sufficient period of time to reduce at least 65% of ethylene glycol from the second molten mixture. The duration of step (c) can also vary. In one embodiment, step (c) lasts from 45 minutes to 100 hours, specifically 1 hour to 50 hours, or more. The pressure at which step (c) can be carried out can vary. In one embodiment, step (b) can be carried out in atmospheric conditions. In another embodiment, step (c) can be carried out in sub-atmospheric conditions. In another embodiment, step (c) can be carried out with excess of the 1,4-butanediol and at a pressure from 30 to 150 kPa absolute, specifically 50 to 125 kPa absolute. Different combinations can be used. In one embodiment, step (c) can be carried out with an excess of 1,4-butanediol and at a pressure from 300 to 1500 mbar absolute. In another embodiment, 1,4-butanediol can be used in a molar excess amount from 1.1 to 5. In one embodiment, the 1,4 butanediol- added in step (c)

can be in a molar amount from 50 mole percent to 450 mole percent, specifically 75 to 400 mole % of the amount of ethylene glycol moieties present in the polyethylene terephthalate component.

The 1,4-butanediol used during step (c) can be added in a molar amount that is in excess relative to the molar amount of butanediol moieties incorporated into the modified polybutylene terephthalate random copolymer component obtained in step (d). The 1,4-butanediol can be added in step (c) in a molar amount that is in at least 1.2 times molar excess relative to the molar amount of butanediol moieties incorporated into the modified polybutylene terephthalate random copolymer component obtained in step (c).

In one embodiment, the step (d) can be carried out for a period of at least 60 minutes. In one embodiment, the step (d) can also be carried out with modifications, depending on the application. In one embodiment, for instance, a component selected from the group of excess butanediol, ethylene glycol, propylene glycol, tetrahydrofuran, and combinations thereof is removed during step (d). In one embodiment, the pressure at which step (d) can be carried out can also vary. In another embodiment, the step (d) can be carried out at a temperature from 230° C. to 260° C. and a pressure that can be less than 0.3 kPa absolute.

During the process the compounds used in the process can be removed and collected or optionally reused. In one embodiment, the monomeric diol component and/or the oligomeric diol component can be removed and collected in a vessel in step (c). In another embodiment, in step (c), 1,4-butanediol and the oligomeric diol are refluxed back into the reactor and a component selected from the group of excess butanediol, ethylene glycol, propylene glycol, tetrahydrofuran, and combinations thereof can be removed. In yet another embodiment, the excess 1,4-butanediol, ethylene glycol, propylene glycol, tetrahydrofuran, and combinations thereof can be removed during step (c). Optionally, the monomeric diol components can be separated and the 1,4-butanediol can be refluxed back into the reactor in step (b) or in step (c). In one embodiment, the oligomeric diol component can be removed and collected during the step (c). In another embodiment, the oligomeric diol component can be separated and refluxed back into the reactor in step (a) or (b). In yet another embodiment, the oligomeric diol component can be returned to the reactor in step (a). In another embodiment, the oligomeric diol component contains at least 50 percent of bis(hydroxybutyl) terephthalate.

The various step process (a), (b), (c), (d) can be carried out in the same reactor. Alternatively, the various step process (a), (b), (c), and (d) may be carried out in at least two reactors.

In another embodiment, the process can include the step of adding a basic compound during step (b), step (c), step (d), and combinations thereof. The basic compound can contain an alkali metal and can be selected from one or more of sodium alkoxides, sodium hydroxide, sodium acetate, sodium carbonate, sodium bicarbonates, potassium alkoxides, potassium hydroxide, potassium acetate, potassium carbonate, potassium bicarbonate lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminium alkoxides, aluminium hydroxide, aluminium acetate, aluminium carbonate, aluminum bicarbonates, and combinations thereof. Typically the amount of the basic compound used can be used is at least 0.1 ppm. In one embodiment, the amount of the basic compound is from 0.1 to 50 ppm. In another embodiment, the amount of the basic compound ranges from 1 to 10 ppm.

In one embodiment, the 1,4-butanediol can be derived from biomass. In another embodiment, the biomass can be a grain selected from the group consisting of corn, wheat, and combinations thereof. In one embodiment, when, the 1,4-butanediol derived from biomass is used, articles can further reduce the use of $CO_2$ emissions that can be ordinary generated when 1,4-butanediol is made from monomers. In one embodiment, the process can reduce tetrahydrofuran by an amount that is at least 25% as compared to the amount of tetrahydrofuran (also known as "THF") produced by a process that depolymerizes the polyethylene terephthalate component with the monomer diol that can be selected from the group consisting of ethylene glycol, 1,4-butanediol, propylene glycol, and combinations thereof containing no oligomeric diol component and the monomeric diol component. In another embodiment, further reduction in the amount of total THF by at least about 10% can be obtained by addition of the basic compound as compared to a process that does not use the basic compound.

In one embodiment, the process for making the PET-derived modified PBT can contain an additional step in which the PBT formed from the second molten mixture is subjected to solid-state polymerization. Solid-state polymerization generally involves subjecting the PBT formed from the second molten mixture to an inert atmosphere and heating to a temperature for a sufficient period of time to build the molecular weight of the PBT. Generally, the temperature to which the PBT is heated is below the melting point of the PBT, e.g., from 5 to 60° C. below the melting point of the PBT. In one embodiment, such a temperature can range from 150 to 210° C. Suitable periods of time during which the solid-state polymerization occurs can range from 2 to 20 hours, depending on the conditions and equipment. The solid-state polymerization can be carried out under tumultuous conditions sufficient to promote further polymerization of the PBT to a suitable molecular weight. Such tumultuous conditions can be created by subjecting the PBT to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar.

In one embodiment, despite having residues derived from polyethylene terephthalate, e.g., ethylene glycol groups, butanediol groups, propylene glycol groups, and isophthalic acid groups (groups that can have long been regarded as undesired components in virgin PBT), the PET-derived modified PBT copolymer exhibits useful properties. The PET-derived PBT copolymers are not "recycled," as the term is ordinarily used, i.e., the compositions are not reprocessed PBT or PET; rather, they are entirely new materials made from PET, a material that can be fundamentally different from PBT. The PET-derived modified PBT is structurally different from "virgin" PBT. Virgin PBT, for instance, is a homopolymer, and thus non-random. The modified PBT of this invention is a copolymer, more specifically a random copolymer.

Compositions comprising the modified PBT copolymer and articles derived from the composition can have useful properties. The physical properties of the PET-derived modified PBT copolymer can vary, depending on factors such as the performance properties that are required, the equipment used, process parameters, and the like. In one embodiment, the inherent viscosity (IV) of the PET-derived modified PBT is at least 0.5 dL/g. In another embodiment, the inherent viscosity is from 1 to 1.3 dL/g, specifically from 0.95 to 1.05 dL/g, more specifically from 0.5 to 1.5 dL/g. All inherent viscosities in this application can refer to those viscosities measured in a solution of 60 wt. % phenol and 40 wt. % 1,1,2,2-tetrachloroethane at 25° C.

In one embodiment, the melting point of the PET-derived modified PBT can be at least 210° C. In another embodiment, the melting point can range from 204° C. to 218° C. In yet another embodiment, the melting point can range from 211° C. to 223° C. In one embodiment, the crystallization temperature of the PET-derived modified PBT is at least 150° C.

In one embodiment, the flexural modulus of the PET-derived modified PBT is 1000 MPa to 5000 MPa. In one embodiment, the tensile strength (at yield) of the PET-derived modified PBT is from 30 MPa to 100 MPa, and the tensile elongation (at yield) of the PET-derived modified PBT is at least 2%. In another embodiment, the heat deflection temperature ranges from 45° C. to 75° C.

In one embodiment, the molecular weight of the PET-derived modified PBT can be at least 3000 g/mol. In another embodiment, the molecular weight of the PET-derived modified PBT can range from 18000 to 42000 g/mol. In yet another embodiment, the molecular weight of the PET-derived modified PBT can range from 30000 to 42000 g/mol.

In one embodiment, the process can further comprise increasing the molecular weight of the polymer obtained in step (d) by subjecting the polymer formed in step (d) to solid-state polymerization. When subjected to solid-state polymerization step, the molecular weight of the PET-derived modified PBT can be at least 15000 g/mol. In one embodiment, the molecular weight of the PET-derived modified PBT that has been subjected to solid-state polymerization can range from 18000 to 50000 g/mol.

In addition to providing a novel process for making PBT from PET, the invention includes embodiments directed to compositions made from such a process. In one embodiment, the PBT formed can be a composition that includes a white, non-yellow, PET-derived modified PBT containing isophthalic acid and ethylene glycol groups, such that the composition can have an inherent viscosity that can be at least 0.55 dL/g or more than 0.55 dL/g and the isophthalic acid and the ethylene glycol are present in an amount that is more than 0.85 wt. %. The inherent viscosity can vary and, advantageously, the process makes it possible to make polymers with a wide range of higher inherent viscosities, e.g., from 0.55 to 1.3 dL/g, or 1.5 dL/g or higher.

In one embodiment, the process can be used to obtain resins in a variety of compositions that can be molded into useful articles by a different means, for example injection molding, extrusion molding, rotation molding, foam molding, calendar molding, blow molding, thermoforming, compaction, melt spinning, and the like, to form articles. Because of their advantageous mechanical characteristics, especially preferred are articles that will be exposed to ultraviolet (UV) light, whether natural or artificial, during their lifetimes, and most particularly outdoor and indoor articles. Suitable articles are exemplified by but are not limited to aircraft, automotive, truck, military vehicle (including automotive, aircraft, and water-borne vehicles), scooter, and motorcycle exterior and interior components, including panels, quarter panels, rocker panels, trim, fenders, doors, decklids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; palm-held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The invention further includes additional fabrication operations of such articles, including but not limited to molding, in-mold decoration, baking in a paint oven, lamination, and/or thermoforming. The articles made from the composition of the present invention can be used widely in automotive industry, home appliances, electrical components, and telecommunications.

In one embodiment, the process is relatively simple, yet effective producing relatively large amounts of PET-derived modified polyesters, such as modified PBT efficiently. In another embodiment, the process can require conditions found can be important for avoiding disadvantages of processes disclosed in the prior art.

Further, in one embodiment, the process for making the PET-derived modified PBT random copolymers can advantageously reduce carbon dioxide emissions and solid waste. Since the PET-derived polyester random modified PBT copolymers made by the current process are made from scrap PET and not monomers, the process can reduce the amount of carbon dioxide emissions and solid waste. Carbon waste reduction (or crude oil savings) can occur because the carbon that constitutes the dimethyl terephthalate or terephthalic acid ordinarily used to make polyesters is not used, rather a PET component, e.g., polyester scrap, is replaced. The process to make dimethyl terephthalate (DMT) or terephthalic acid (TPA) from crude oil can be highly energy intensive and as a result, substantial emissions of carbon dioxide to the atmosphere can occur from burning of non-renewable energy sources. By not using DMT or TPA to make the PET derived PBT, carbon dioxide emissions savings can be obtained. In one embodiment, the process for making PET-derived modified PBT can eliminate at least 1 kg of carbon dioxide emissions for every kilogram of PET-derived modified PBT made with the process, as compared to a process that makes virgin PBT homopolymers from monomers. In another embodiment, the process for making PET-derived modified PBT can eliminate from 1 kg to 1.5 kg, or more carbon dioxide emissions for every kilogram of PET-derived modified PBT made with the inventive process, as compared to a process that makes virgin PBT homopolymers from monomers. Additionally, there can be energy savings/reduced carbon dioxide emissions when the ethylene glycol byproduct is recovered and is used instead of ordinary ethylene glycol in manufacturing.

Additionally, when the source of butanediol is from biomass-derived feedstocks such as succinic acid, the carbon dioxide savings can be further increased for two reasons. Bio-derived succinic acid can be made form sugars or other bio-derived hydrocarbons that can be derived from atmospheric carbon vs. fossil fuel carbon sources. Use of bio-derived succinic acid can reduce the environmental impact of any polymer derived from butanediol. Furthermore, the fermentation to yield succinic acid can require carbon dioxide as an input thus leading to further carbon dioxide reductions.

Advantageously, a modified polybutylene terephthalate random copolymer can have a reduced carbon dioxide emissions index. The reduced carbon dioxide emissions index, as defined in this application, is the amount of carbon dioxide, expressed in kg, that can be saved when one kg of a composition containing the modified polybutylene terephthalate random copolymer is made, as compared to the amount of carbon dioxide, expressed in kg, that can be created when the composition is made with polybutylene terephthalate that is derived from monomers. Generally, the modified PBT random copolymers have a reduced carbon dioxide emissions index that can be more than approximately 1.3 kg, and can range from 1.3 kg to 2.5 kg.

The basis for this feature is discussed below. The difference between the amount of carbon dioxide that can be created during ordinary processes for making virgin, monomer-derived PBT and the process for making 1 kg of the modified polybutylene terephthalate random copolymers can range from 1.3 kg to 2.5 kg, or more suitably from 1.7 kg to 2.2 kg. It should be noted that this difference is based on calculations for the entire process that starts from crude oil to the monomers to the PBT versus scrap PET to oligomers to the modified PBT. In other words, the process for making 1 kg of the modified polybutylene terephthalate random copolymers can create 1.3 to 2.5 kilograms less carbon dioxide as compared to the process for making 1 kg of virgin PBT from crude oil.

These results can be derived and verified by using material and energy balance calculations (calculations that are well know in the chemical engineering art) and comparing the amount of energy used to make modified PBT random copolymers from PET and the amount of energy used to make PBT from terephthalic acid or dimethylterephthalate.

The invention is further described in the following illustrative examples in which all parts and percentages are by weight unless otherwise indicated.

EXAMPLES

Materials

Table 1 provides the details of the materials their source.

TABLE 1

| Abbreviation | | Source |
|---|---|---|
| BDO | 1,4-Butanediol | The butanediol was obtained from BASF and had a purity specification of greater than 99.5 wt. %. |
| BHBT | Bis(hydroxybutyl) terephthalate | BHBT was prepared and purified by the procedure given for crude BHBT in the Journal of Applied Polymer Science, Volume 62, pgs 473-480, 1996. |
| TPT | Triisopropyl titanium | Tyzor grade from Dupont |
| PET | Polyethylene terephthalate | Green colored recycle PET pellets were obtained from St. Jude, a supplier in North America. |

Procedure/Techniques

The overall quantity of individual materials and the reaction scale used are shown in Table 2.

TABLE 2

Amount of raw materials taken and amount of modified PBT obtained for Examples 1 and 2 and Comparative Example 1.

| (gms) | PET Flakes | BDO for Depolym. | BDO for Transester. | Total BDO | BHBT | PBT |
|---|---|---|---|---|---|---|
| CEx. 1 | 125 | 87.9 | 123 | 210.9 | — | 143.23 |
| Ex. 1 | 125 | 29.36 | 123.1 | 152.46 | 201.82 | 286.46 |
| Ex. 2 | 125 | 29.32 | 64.53 | 93.85 | 201.82 | 286.46 |

The reaction conditions employed for the depolymerization, transesterification and polycondensation for examples 1 and 2 and comparative example 1 are presented in Table 3.

TABLE 3

Process conditions for depolymerization, transesterification, and polycondensation.

| | CEx. 1 | Ex. 1 | Ex. 2 |
|---|---|---|---|
| Depolymerization | | | |
| Wt. of Distillate (gms) | 11.15 | 9.64 | 10.11 |
| Pressure (Bar) | 1 | 1 bar | 1 bar |
| Temperature (° C.) | 215.3 | 215.1 | 214.9 |
| Transesterification 2$^{nd}$ Mixture | | | |
| Wt. of Distillate (gms) | 88.13 | 72.58 | 33.13 |
| Pressure (m Bar) | 600 | 600 | 600 |
| Temperature (° C.) | 215-182.1-215.8 | 215.1-184.1-216.2 | 214.9-198.1-215.1 |

TABLE 3-continued

Process conditions for depolymerization, transesterification, and polycondensation.

|  | CEx. 1 | Ex. 1 | Ex. 2 |
| --- | --- | --- | --- |
| Transesterification 3$^{rd}$ Mixture | | | |
| Wt. of Distillate (gms) | 54.04 | 70.26 | 65.22 |
| Pressure (m Bar) | 100 | 100 | 100 |
| Temperature (° C.) | 215-205.4-226.1 | 216.2 to 208.6 to 227.4 | 215.1-202.4-230.1 |
| Polycondensation | | | |
| Wt. of Distillate (gms) | 13.95 | 19.19 | 11.28 |
| Pressure (m Bar) | 0.3 | 0.42 | 0.33 |
| Temperature (° C.) | 226.1-250.2 | 227.4-250.8 | 230.1-252.4 |

Pet Scrap Cleaning Process

Green colored PET scrap from bottles was obtained from a commercial source. In the scrap cleaning process, the PET scrap was cleaned manually, with a hot water wash, manual sorting to separate colored bottles and PVC bottles, crushing, hydrofloatation to separate PP, labels, and caps etc., alkali wash to remove glue, and finally a demineralized water wash to remove alkali, followed by drying. The resulting PET flakes were used as the main raw material in the depolymerization step. The post consumer recycle PET flakes had an IV specification of 0.68 to 0.78 dl/g and a melting point specification of 245° C. to 255° C. The PVC content was less than 10 ppm by specification.

Depolymerization

Depolymerization of PET flakes was carried out at a mole ratio of PET ('mer' repeat unit) to the combined amounts of butanediol and bis(4-hydroxybutyl) terephthalate in the range of 1:0.8 to 1:2.0 to make the depolymerization product. The reaction was conducted in the presence of catalyst (titanium, antimony or tin compounds (range from 50 to 125 ppm)) or without any added catalyst. The bis-(4-hydroxybutyl) terephthalate, with some free BDO, that can also be recycled from the transesterification process, was used to dissolve the recycled PET. If required, BDO was added to ensure that the mixture has sub-stoichiometric quantities of BDO (5-50% of stoichiometry) to facilitate depolymerization of the PET. The process was carried out under a pressure in the range 1.0 bar –6 bar and at a temperature of 200° C. to 260° C. and 1-3 bar pressure). The total time of depolymerization was in the range from 20 to 120 min and preferably 30 to 100 min. This is further followed by filtration of the mass to remove black specs and other insoluble impurities. The resulting mass was called the first mixture.

Transesterification

Transesterification was done by reacting the first mixture with BDO with or without co-catalyst. The co-catalyst in some of the examples was sodium methoxide of (10-14 ppm). The additional BDO was taken in excess over the stoichiometric requirement, and the total BDO mole ratio of excess to stoichiometric requirement that ranged from 2.0 to 4. The reaction was conducted in the presence of additional amount of catalyst (50-120 ppm of Ti, Sn or Sb catalysts or combinations thereof) at temperature range of 200 to 245° C. at pressure range from 30 kPa to 100 kPa for 10 to 60 min. During this period, the vapors were passed through a distillation column wherein the ethylene glycol and THF were removed after separation from BDO, which was refluxed back into the reactor. This resulted in the reaction mass called second mixture. At this stage, 80% of total ethylene glycol (EG) present both as free and as bound is removed by distillation. The BDO was reused in the transesterification step. The THF and water mixture was sent to storage vessels. The reaction was continued as described below to form the third mixture. The pressure was lowered to 100 mbar, and a significant portion of the excess BDO was separated from the mixture. This results in a reaction mass called a second mixture. Part of the second mixture was recycled in the depolymerization process, and the remaining portion was sent to the polycondensation process described below.

Polycondensation

Polycondensation using the third mixture was conducted at 230 to 265° C. The pressure was gradually reduced to a level of 0.01 kPa to 1 kPa to enable molecular weight build-up. The reaction was conducted for 45 to 120 min. During the polycondensation process, excess BDO and residual EG was removed, along with THF and water. The vapor byproducts were subjected to distillation to separate EG, BDO, THF and water mixture. The final polymer product (PBT) had an IV from 0.5 and 1.5 dl/gm and EG content less than 0.4 wt. %, based on final copolymer weight. Typically, the IPA content was less than 2 wt. % of the copolymer. The melting point of the final polymer was in the range of 215 to 222° C.

TABLE 4

Composition of the components derived during depolymerization, transesterification and polycondensation processes for Examples 1 and 2 and Comparative Example 1.

| | Composition by GC Analysis (Wt %) | | | | Composition by Wt (gms) | | | | BDO Usage Kg/Kg of PBT | THF gm/Kg of PBT |
|---|---|---|---|---|---|---|---|---|---|---|
| | THF | Water | EG | BDO | THF | Water | EG | BDO | | |
| CEx. 1 | | | | | | | | | 0.730 | 258.68 |
| Depolym. | 86.77 | 11.43 | 1.03 | 0.78 | 28.33 | 3.73 | 0.34 | 0.25 | | |
| Transester 2$^{nd}$ Mixture | 5.40 | 6.86 | 34.98 | 52.76 | 4.76 | 6.05 | 30.82 | 46.50 | | |
| Transester 3$^{rd}$ Mixture | 1.48 | 3.19 | 8.33 | 87.01 | 0.80 | 1.72 | 4.50 | 47.02 | | |
| Polycon. | 0.96 | 3.21 | 5.76 | 90.08 | 0.13 | 0.45 | 0.80 | 12.57 | | |
| Vacuum Trap | 77.25 | 20.15 | 1.22 | 1.38 | 3.03 | 0.79 | 0.05 | 0.05 | | |
| Total | | | | | 37.05 | 12.74 | 36.51 | 106.39 | | |
| Ex. 1 | | | | | | | | | 0.563 | 116.48 |
| Depolym. | 78.99 | 9.24 | 0.89 | 10.88 | 21.27 | 2.49 | 0.24 | 2.93 | | |
| Transester 2$^{nd}$ Mixture | 11.84 | 10.34 | 36.30 | 41.53 | 8.59 | 7.50 | 26.35 | 30.14 | | |
| Transester 3$^{rd}$ Mixture | 0.75 | 1.95 | 13.57 | 83.74 | 0.52 | 1.37 | 9.53 | 58.83 | | |
| Polycon. | 0.30 | 1.73 | 7.56 | 90.42 | 0.06 | 0.33 | 1.45 | 17.35 | | |
| Vacuum Trap | 75.78 | 22.33 | 0.23 | 1.67 | 2.92 | 0.86 | 0.01 | 0.06 | | |
| Total | | | | | 33.37 | 12.56 | 37.58 | 109.32 | | |
| Ex. 2 | | | | | | | | | 0.543 | 104.78 |
| Depolym. | 79.12 | 19.50 | 0.58 | 0.80 | 16.39 | 4.04 | 0.12 | 0.16 | | |
| Transester 2$^{nd}$ Mixture | 28.00 | 26.01 | 30.77 | 15.24 | 9.28 | 8.62 | 10.19 | 5.05 | | |
| Transester 3$^{rd}$ Mixture | 2.02 | 4.17 | 27.63 | 66.19 | 1.32 | 2.72 | 18.02 | 43.17 | | |
| Polycon. | 0.55 | 4.08 | 23.57 | 71.80 | 0.06 | 0.46 | 2.66 | 8.10 | | |
| Vacuum Trap | 79.11 | 20.14 | 0.15 | 0.60 | 2.97 | 0.76 | 0.01 | 0.02 | | |
| Total | | | | | 30.02 | 16.59 | 31.00 | 56.50 | | |

The examples, as per Table 4, show that the process is versatile and can produce modified polybutylene terephthalate copolymers at different THF formation levels. The disclosed process enables reduction in THF formation relative to the comparative example C. Ex. 1 (see Table 4).

TABLE 5

Composition by NMR analysis of the modified PBT.

| | Isophthalic acid | Terephthalic acid | BDO | DEG | EG | Total |
|---|---|---|---|---|---|---|
| CEx. 1 | | | | | | |
| Mole % | 1.14 | 48.76 | 49.19 | 0.3 | 0.61 | 100 |
| Weight | 1.69 | 72.16 | 35.42 | 0.26 | 0.27 | 109.8 |
| Weight % | 1.54 | 65.72 | 32.26 | 0.24 | 0.24 | |
| Ex. 1 | | | | | | |
| Mole % | 0.82 | 49.19 | 49.01 | 0.25 | 0.74 | 100.01 |
| Weight | 1.21 | 72.80 | 35.29 | 0.22 | 0.33 | 109.85 |
| Weight % | 1.10 | 66.27 | 32.12 | 0.20 | 0.30 | |
| Ex. 2 | | | | | | |
| Mole % | 0.65 | 49.06 | 46.97 | 0.25 | 3.07 | 100 |
| Weight | 0.96 | 72.61 | 33.82 | 0.22 | 1.35 | 108.96 |
| Weight % | 0.88 | 66.64 | 31.04 | 0.20 | 1.24 | |

While this disclosure describes exemplary embodiments, it will be understood by those skilled in the art that various changes can be made and equivalents can be substituted for elements thereof without departing from the scope of the disclosure. In addition, many modifications can be made to adapt a particular situation or material to the teachings of this disclosure without departing from the essential scope thereof. Therefore, it is intended that this disclosure not be limited to the particular embodiments disclosed as the best mode contemplated for carrying out this disclosure.

What is claimed is:

1. A process for the manufacture of a modified polybutylene terephthalate, the process comprising:
   reacting
   (i) an oligomeric diol component selected from the group consisting of bis(hydroxybutyl) terephthalate, bis(hydroxybutyl) isophthalate, hydroxybutyl-hydroxyethyl terephthalate, hydroxybutyl-hydroxyethyl isophthalate, bis(hydroxypropyl) terephthalate, bis(hydroxypropyl) isophthalate, hydroxybutyl-hydroxypropyl terephthalate, hydroxybutyl-hydroxypropyl isophthalate, hydroxyethyl-hydroxypropyl terephthalate, hydroxyethyl-hydroxypropyl isophthalate, and combinations thereof in a reactor, with
   (ii) a polyethylene terephthalate component selected from the group consisting of polyethylene terephthalates, polyethylene terephthalate copolymers, and combinations thereof, and (iii) a monomer diol component selected from the group consisting of 1,4-butanediol, ethylene glycol, propylene glycol, and combinations thereof in a reactor under conditions effective to depolymerize the polyethylene terephthalate component to form a first molten mixture, the first molten mixture comprising a component selected from the group consisting of oligomers comprising ethylene terephthalate moieties, oligomers comprising ethylene isophthalate moieties, oligomers comprising diethylene glycol terephthalate moieties, oligomers comprising diethylene glycol isophthalate moieties, oligomers comprising trimethylene terephthalate moieties, oligomers comprising trimethylene isophthalate moieties, oligomers comprising butylene terephthalate moieties, oligomers comprising butylene isophthalate moieties, oligomers comprising dibutylene terephthalate moieties, oligomers comprising dibutylene isophthalate moieties, covalently bonded oligomeric moieties comprising at least two of the foregoing moieties, ethylene glycol, propylene glycol, 1,4-butanediol, and combinations thereof;

adding 1,4-butanediol to the first molten mixture under conditions effective to form a second molten mixture comprising a component selected from the group consisting of oligomers comprising ethylene terephthalate moieties, oligomers comprising ethylene isophthalate moieties, oligomers comprising diethylene glycol terephthalate moieties, oligomers comprising diethylene glycol isophthalate moieties, oligomers comprising trimethylene terephthalate moieties, oligomers comprising trimethylene isophthalate moieties, oligomers comprising butylene terephthalate moieties, oligomers containing butylene isophthalate moieties, covalently bonded oligomeric moieties comprising at least two of the foregoing moieties, 1,4-butanediol, propylene glycol, ethylene glycol, and combinations thereof; and increasing the temperature of the second molten mixture to form the modified polybutylene terephthalate.

2. The process of claim 1, wherein the oligomeric diol component comprises units derived from compounds of the structure (I)

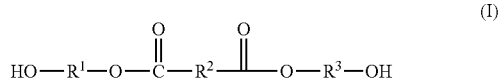

wherein R² is selected from the group consisting of structure (II), structure (III), and combinations thereof:

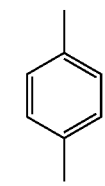

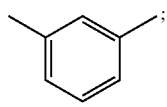

and R¹ selected from the group consisting of —(CH$_2$)$_4$— and —(CH$_2$)$_2$—, and —(CH$_2$)$_3$— and R³ is selected from the group consisting of (CH$_2$)$_4$— and —(CH$_2$)$_3$—.

3. The process of claim 1, wherein the modified polybutylene terephthalate is a copolymer comprising at least one residue derived from the polyethylene terephthalate component and selected from the group consisting of ethylene glycol groups, diethylene glycol groups, isophthalic acid groups, and combinations thereof.

4. The process of claim 1, wherein the modified polybutylene terephthalate comprises at least one residue derived from the polyethylene terephthalate component and selected from the group consisting of antimony-containing compounds, germanium-containing compounds, titanium-containing compounds, cobalt-containing compounds, tin-containing compounds, aluminum salts, cis-1,3-cyclohexane dimethanol groups, cis-1,4-cyclohexane dimethanol groups, trans-1, 3-trans cyclohexane dimethanol groups, trans-1,4-cyclohexane dimethanol groups, alkaline earth metal salts, alkali salts, phosphorous-containing groups, phosphorous-containing anions, sulfur-containing groups, sulfur-containing anions, naphthalene dicarboxylic acid groups, 1,3-propanediol moieties, and combinations thereof.

5. The process of claim 1, wherein the modified random polybutylene terephthalate comprises from more than 0 ppm to 1000 ppm of an inorganic residue selected from the group consisting of antimony-containing compounds, germanium-containing compounds, titanium-containing compounds, cobalt-containing compounds, tin-containing compounds, aluminum, aluminum salts, alkali salts, calcium salts, magnesium salts, sodium salts, potassium salts, phosphorous-containing anions, sulfur-containing anions, and combinations thereof.

6. The process of claim 1, wherein the modified random polybutylene terephthalate polymer comprises from more than 0 ppm to 1000 ppm of an inorganic residue selected from the group consisting of calcium salts, magnesium salts, sodium salts, potassium salts, and combinations thereof.

7. The process of claim 1, wherein the amount of the monomeric diol component added to the reactor is from 50 mole percent to 250 mole percent of the amount of ethylene glycol moieties present in the polyethylene terephthalate component prior to the reacting.

8. The process of claim 1, wherein the oligomeric diol component and the monomeric diol component are present in a mole ratio of oligomeric diol component to monomeric diol component of 0.25 to 4.0 prior to the reacting.

9. The process of claim 1, wherein an amount of the 1,4-butanediol added to the first molten mixture is from 50 mole percent to 450 mole percent of the amount of ethylene glycol moieties present in the polyethylene terephthalate component prior to the reacting.

10. The process of claim 1, further comprising removing unreacted oligomeric diol component during the adding of the 1,4-butanediol to the first molten mixture.

11. The process of claim 10, further comprising returning the removed oligomeric diol component to the reactor during the reacting of the of the oligomeric diol component with the polyethylene terephthalate component and the monomeric diol component.

12. The process of claim 1, wherein the oligomeric diol component comprises at least 50 percent of bis(hydroxybutyl) terephthalate.

13. The process of claim 1, further comprising removing a component selected from the group consisting of excess 1,4-butanediol, ethylene glycol, propylene glycol, tetrahydrofuran, and combinations thereof from the reactor during the reacting of the oligomeric diol component with the polyethylene terephthalate component and the monomeric diol component.

14. The process of claim 13, wherein 1,4-butanediol is removed, and the removed 1,4-butanediol is returned into the reactor during the reacting of the oligomeric diol component with the polyethylene terephthalate component and the monomeric diol component.

15. The process of claim 1, further comprising removing a component selected from the group consisting of 1,4-butanediol, ethylene glycol, propylene glycol, tetrahydrofuran, and combinations thereof during the adding of the 1,4-butanediol to the first molten mixture.

16. The process of claim 1, wherein the reacting of the oligomeric diol component with the polyethylene terephthalate component and the monomeric diol component is carried out for at least 25 minutes.

17. The process of claim 1, wherein the reacting of the oligomeric diol component with the polyethylene terephthalate component and the diol component is carried out at a temperature from 180° C. to 250° C.

18. The process of claim 1, wherein reacting of the oligomeric diol component with the polyethylene terephthalate component and the monomeric diol component is carried out at a pressure from 100 kPa to 500 kPa absolute.

19. The process of claim 1, wherein the adding of the 1,4-butanediol to the first molten mixture is carried out at a pressure from 40 kPa to 100 kPa absolute.

20. The process of claim 1, wherein the adding of the 1,4-butanediol to the first molten mixture is carried out at a temperature from 180° C. to 230° C.

21. The process of claim 1, wherein adding of the 1,4-butanediol to the first molten mixture is carried out for a sufficient period of time to react at least 65% of the ethylene glycol from the second molten mixture.

22. The process of claim 1, wherein the adding of the 1,4-butanediol to the first molten mixture is carried out for at least 30 minutes.

23. The process of claim 1, wherein the increasing of the temperature of the second molten mixture is carried out for at least 60 minutes.

24. The process of claim 1, wherein the increasing of the temperature of the second molten mixture is to a temperature from 230° C. to 260° C.

25. The process of claim 1, wherein increasing of the temperature of the second molten mixture is carried out at a pressure that is less than 0.3 kPa absolute.

26. The process of claim 1, further comprising adding a catalyst during a step selected from the group consisting of the reacting of the oligomeric diol component with the polyethylene terephthalate component and the diol component, the adding of the 1,4-butanediol to the first molten mixture, the increasing of the temperature of the second molten mixture, and combinations thereof.

27. The process of claim 1, wherein the process further comprises adding a basic compound during a step selected from the group consisting of reacting of the oligomeric diol component with the polyethylene terephthalate component and the diol component, the adding of the 1,4-butanediol to the first molten mixture, the increasing of the temperature of the second molten mixture, and combinations thereof.

28. The process of claim 1, wherein the process is carried out in the same reactor.

29. The process of claim 1, wherein the process is carried out in at least two reactors.

30. The process of claim 1, wherein the modified random polybutylene terephthalate polymer has an inherent viscosity from 0.5 dL/g to 1.5 dL/g.

31. The process of claim 1, further comprising solid state polymerizing the modified random polybutylene terephthalate polymer.

32. The process of claim 1, wherein the monomeric diol component is ethylene glycol, and the modified random polybutylene terephthalate polymer comprises at least 25 percent less tetrahydrofuran than a modified random polybutylene terephthalate polymer produced by a process wherein no oligomeric diol component is present during depolymerizing the polyethylene terephthalate component in the presence of the monomeric diol component.

33. A process comprising:
reacting
(i) an oligomeric diol component selected from the group consisting of bis(hydroxybutyl) terephthalate, bis(hydroxybutyl) isophthalate, hydroxybutyl-hydroxyethyl terephthalate, hydroxybutyl-hydroxyethyl isophthalate, bis(hydroxypropyl) terephthalate, bis(hydroxypropyl) isophthalate, hydroxybutyl-hydroxypropyl terephthalate, hydroxybutyl-hydroxypropyl isophthalate, hydroxyethyl-hydroxypropyl terephthalate, hydroxyethyl-hydroxypropyl isophthalate, and combinations thereof to a reactor, with
(ii) a polyethylene terephthalate component selected from the group consisting of polyethylene terephthalate and polyethylene terephthalate copolymers and
(iii) a monomer diol component selected from the group consisting of 1,4-butanediol, ethylene glycol, propylene glycol, and combinations thereof
in a reactor under conditions effective to depolymerize the polyethylene terephthalate component to form a first molten mixture,
the first molten mixture comprising a component selected from the group consisting of oligomers comprising ethylene terephthalate moieties, oligomers comprising ethylene isophthalate moieties, oligomers comprising diethylene glycol terephthalate moieties, oligomers comprising diethylene glycol isophthalate moieties, oligomers comprising trimethylene terephthalate moieties, oligomers comprising trimethylene isophthalate moieties, oligomers comprising butylene terephthalate moieties, oligomers comprising butylene isophthalate moieties, oligomers comprising dibutylene terephthalate moieties, oligomers comprising dibutylene isophthalate moieties, covalently bonded oligomeric moieties comprising at least two of the foregoing moieties, ethylene glycol, propylene glycol, 1,4-butanediol, and combinations thereof;
adding 1,4-butanediol to the first molten mixture under conditions effective to form a second molten mixture, the second molten mixture comprising a component selected from the group consisting of oligomers comprising ethylene terephthalate moieties, oligomers comprising ethylene isophthalate moieties, oligomers comprising diethylene glycol terephthalate moieties, oligomers comprising diethylene glycol isophthalate moieties, oligomers comprising trimethylene terephthalate moieties, oligomers comprising trimethylene isophthalate moieties, oligomers comprising butylene terephthalate moieties, oligomers containing butylene isophthalate moieties, covalently bonded oligomeric moieties comprising at least two of the foregoing moieties, 1,4-butanediol, propylene glycol, ethylene glycol, and combinations thereof; and increasing the temperature of the second molten mixture to form the modified polybutylene terephthalate polymer; and further comprising collecting excess oligomeric diol component during the adding of the 1,4-butanediol under conditions effective to form a second molten mixture; and returning the collected oligomeric diol component to the reactor during the reacting of the oligomeric diol component, the monomeric diol component, and the polyethylene terephthalate component.

34. A process comprising:

reacting (i) bis(hydroxybutyl) terephthalate, (ii) a polyethylene terephthalate component selected from the group consisting of polyethylene terephthalate and polyethylene terephthalate copolymers, and (iii) 1,4-butanediol, in a reactor under conditions effective to depolymerize the polyethylene terephthalate component to form a first molten mixture, the first molten mixture comprising a component selected from the group consisting of oligomers comprising ethylene terephthalate moieties, oligomers comprising ethylene isophthalate moieties, oligomers comprising diethylene glycol terephthalate moieties, oligomers comprising diethylene glycol isophthalate moieties, oligomers comprising butylene terephthalate moieties, oligomers comprising butylene isophthalate moieties, oligomers comprising dibutylene terephthalate moieties, oligomers comprising dibutylene isophthalate moieties, covalently bonded oligomeric moieties comprising at least two of the foregoing moieties, ethylene glycol, 1,4-butanediol, and combinations thereof;

adding 1,4-butanediol to the first molten mixture under conditions effective to form a second molten mixture, the second molten mixture comprising a component selected from the group consisting of oligomers comprising ethylene terephthalate moieties, oligomers comprising ethylene isophthalate moieties, oligomers comprising diethylene glycol terephthalate moieties, oligomers comprising diethylene glycol isophthalate moieties, oligomers comprising butylene terephthalate moieties, oligomers containing butylene isophthalate moieties, covalently bonded oligomeric moieties comprising at least two of the foregoing moieties, 1,4-butanediol, ethylene glycol, and combinations thereof; and increasing the temperature of the second molten mixture to form the modified polybutylene terephthalate polymer; and further comprising collecting excess oligomeric diol component during the adding of the 1,4-butanediol under conditions effective to form a second molten mixture; and returning the collected oligomeric diol component to the reactor during the reacting of the oligomeric diol component, the monomeric diol component, and the polyethylene terephthalate component.

\* \* \* \* \*